United States Patent [19]
Kawano

[11] Patent Number: 5,528,337
[45] Date of Patent: Jun. 18, 1996

[54] SHUTTER CONTROL DEVICE

[75] Inventor: Kiyoshi Kawano, Tokyo, Japan

[73] Assignee: Asahi Kogaku Kogyo Kabushiki Kaisha, Tokyo, Japan

[21] Appl. No.: 358,969

[22] Filed: Dec. 19, 1994

Related U.S. Application Data

[63] Continuation of Ser. No. 162,366, Dec. 7, 1993, abandoned, which is a continuation of Ser. No. 767,155, Sep. 30, 1991, abandoned.

[30] Foreign Application Priority Data

Oct. 2, 1990 [JP] Japan ..................................... 2-264731

[51] Int. Cl.⁶ .................................................. G03B 17/38
[52] U.S. Cl. ........................................ 354/266; 354/288
[58] Field of Search ..................................... 354/266, 226, 354/288, 486

[56] References Cited

U.S. PATENT DOCUMENTS

| | | | |
|---|---|---|---|
| 4,051,496 | 9/1977 | Iida et al. | 354/266 X |
| 4,208,113 | 6/1980 | Prochnow | 354/266 X |
| 4,998,125 | 3/1991 | Watanabe et al. | 354/266 X |

FOREIGN PATENT DOCUMENTS 2096337  4/1982  United Kingdom.

OTHER PUBLICATIONS

Photographic Industries article, vol. 37, No. 16, Dec. 1979.
Photographic Industries article, vol. 41, No. 4, Apr. 1983.

*Primary Examiner*—Howard B. Blankenship
*Attorney, Agent, or Firm*—Greenblum & Bernstein

[57] ABSTRACT

A shutter control device is disclosed which includes a shutter release operating mechanism which can be attached to either a right shoulder or a left shoulder of a camera body which is formed to have a bisymmetric shape. Contacts, through which a signal for releasing the shutter is passed, are provided at both the right shoulder and the left shoulder. The shutter release operating mechanism is provided with a release button for closing the contacts to thereby release the shutter.

18 Claims, 4 Drawing Sheets

SHUTTER CONTROL DEVICE

This application is a continuation of application Ser. No. 08/162,366, filed Dec. 7, 1993, now abandoned, which is a continuation of Ser. No. 07/767,155, filed Sep. 30, 1991, now abandoned.

BACKGROUND OF THE INVENTION

1. Field of the Invention

The present invention relates to a shutter control device of a camera.

2. Description of the Related Art

A conventional camera is usually manufactured on the assumption that the operator is right-handed, although a half-size camera for a left-handed person is now manufactured and commercially available in which an attached position of the release button and a shape of the grip portion are opposite to those of a camera for a right-handed person. Additionally, a camera is known which is constructed in such a manner that a release button for a left-handed person can be attached to a camera body of a usual camera made for a right-handed person.

In the former camera, accessories for a right-handed person and accessories for a left-handed person must be separately manufactured; therefore, a problem arises in that the camera becomes too expensive. Also, in the latter camera, since the camera body is shaped to fit a right-handed person, it is not necessarily easy for a left-handed person to hold the camera body.

SUMMARY OF THE INVENTION

Therefore, an object of the present invention is to provide a shutter control device which is easily manufactured without increasing the cost and number of parts, and so that both a right-handed person and a left-handed person can easily and comfortably hold the camera body.

According to the present invention, there is provided a shutter control device of a camera. An operating unit is provided which can be adapted to be used for releasing a shutter of the camera. The operating unit is attachable to portions of the camera body which are bisymmetrically located about the center line of the camera body.

Further, according to the present invention, there is provided a shutter control device of a camera, which comprises contacts for carrying out a shutter release operation of the camera, and an operation part including a release button for closing the contacts to thereby carry out the shutter release operation. The contacts are provided on bisymmetric positions of the camera body about the center line thereof. The operation part is selectively attached to one of the portions of the camera body at which the contacts are provided.

Furthermore, according to the present invention, there is provided a shutter control device of a camera, which device comprises a releasing mechanism for releasing a shutter of the camera, and a shutter release operation part provided for actuating the releasing mechanism. The shutter release operation part is attachable to portions positioned bisymmetrically about the center line of the camera body.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
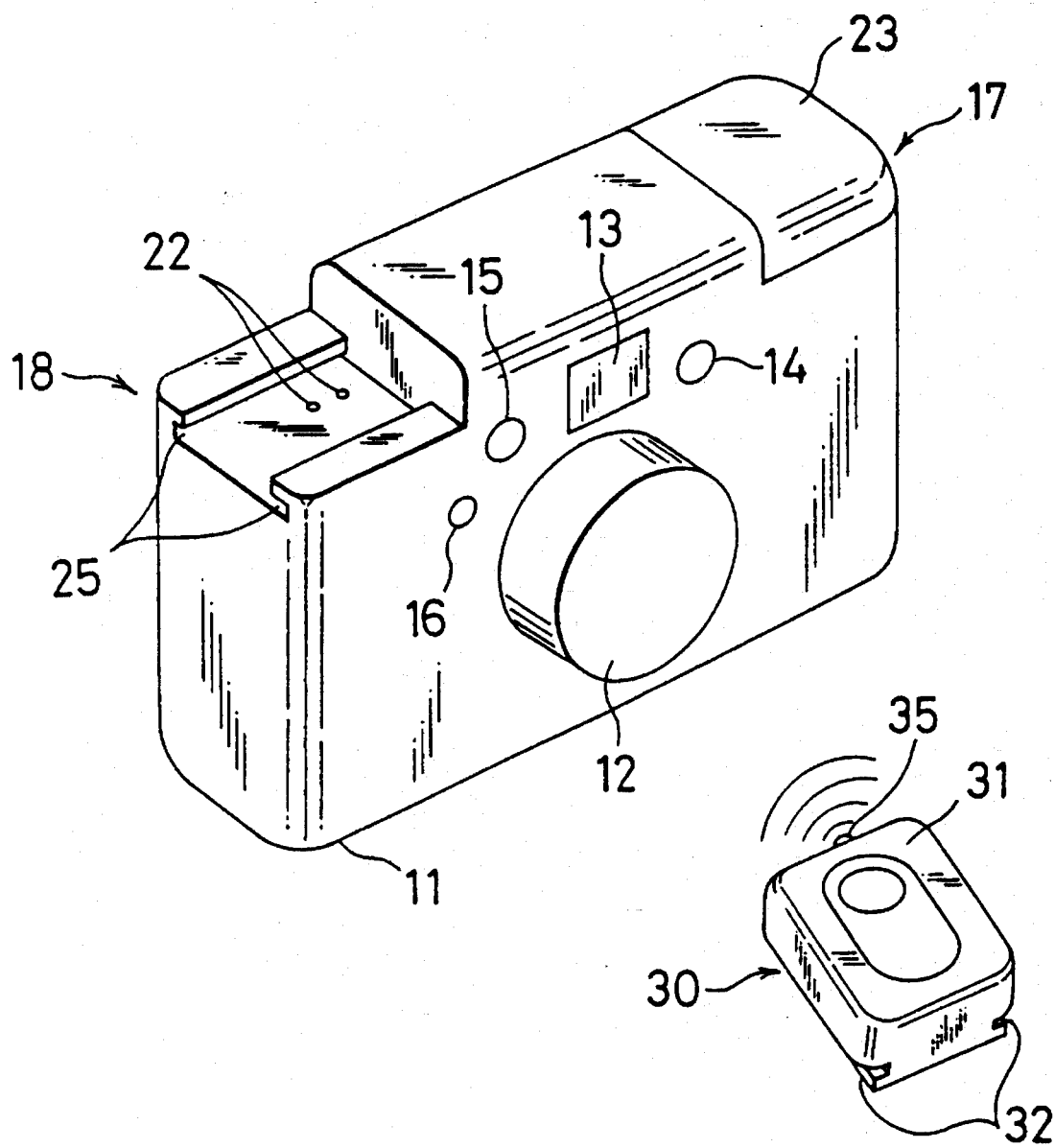
FIG. 1 is a perspective view showing a camera to which an embodiment of the present invention is applied, in a state in which a shutter release operating mechanism is detached from the camera body.

The present invention will now be described with reference to embodiments shown in the drawings.

Figure 2:
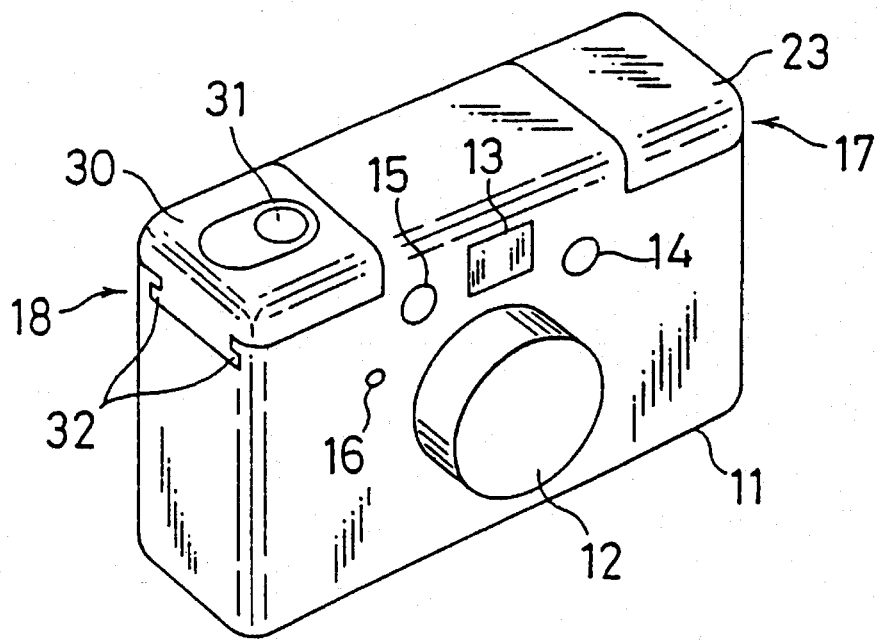
FIG. 2 is a perspective view showing the camera in a state in which the shutter release operating mechanism and a cap are attached to the camera body.
Figure 3:
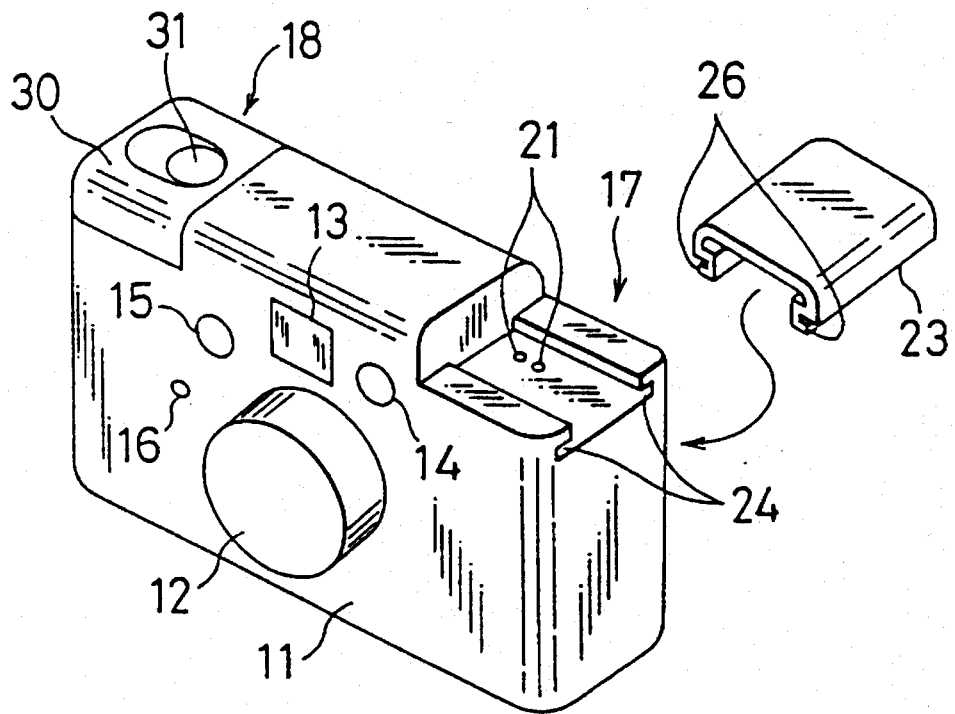
FIG. 3 is a perspective view showing the camera in a state in which the cap is detached from the camera body.

In FIGS. 1 through 3, a camera body 11 is provided with a lens 12, a view-finder 13, a radiating section 14 for an automatic focusing (AF) control of the camera, a receiving section 15 for the AF control, and a receiving section 16 for a remote control. The radiating section 14 is provided for radiating an infrared beam to an object, for the AF control. The receiving section 15 is provided for receiving the infrared beam radiated by the object, to carry out the AF control, as is well-known.

When viewing the camera body 11 from the lens 12 side (or a front side), a right shoulder portion 17 and a left shoulder portion 18 of the camera body 11 are provided with contacts or terminals 21 (FIG. 3) and 22, respectively. These contacts 21 and 22 are disposed bisymmetrically at positions on the camera body 11 about a center line which passes vertically through the camera body 11, and are provided for carrying out a shutter release operation of the camera. Namely, the contacts 21 and 22 are provided on both sides of the camera body 11 located at either side of the lens 12.

A shutter release operating mechanism 30 is provided for carrying out the shutter release operation through the contacts 21 and 22 or the receiving section 16. Namely, the operating mechanism 30 is provided with both a release button 31 and a transmitting section 35, for the shutter release operation. In a state in which the operating mechanism 30 is attached to the camera body 11 as shown in FIGS. 2 and 3, the release button 31 can close the contacts 21 or 22 to release a shutter release mechanism of the camera. Conversely, in a state in which the operating mechanism 30 is detached from the camera body 11 as shown in FIG. 1, the shutter release mechanism can be released by pointing the transmitting section 35 at the receiving section 16 and depressing the release button 31.

The shutter release operating mechanism 30 is constructed as a separate body from the camera body 11, and can be attached selectively to the right shoulder 17 or the left shoulder 18 of the camera body 11. Namely, the operating mechanism 30 is attachable to portions which are bisymmetrically located about the center line of the camera body 11. Also a cap 23 can be selectively attached to the right shoulder 17 or the left shoulder 18 to which the shutter release operating mechanism 30 is not attached. The cap 23 and the shutter release operating mechanism 30 have substantially the same external shape and size.

The right shoulder 17 and the left shoulder 18 are provided with a pair of guide grooves 24 and 25, respectively, extending along the lateral direction of the camera body 11. The shutter release operating mechanism 30 is provided with a pair of guide projections 32 engagable with the guide grooves 24 and 25. Accordingly, the shutter release operating mechanism 30 can be attached to the right shoulder 17 or the left shoulder 18 by slidably engaging the guide projections 32 with the guide grooves 24 or 25, respectively. Similar to the shutter release operating mechanism 30, the cap 23 has a pair of guide projections 26 engagable with the guide grooves 24 or 25, whereby the cap 23 can be attached to the right shoulder 17 or the left shoulder 18.

Figure 4:
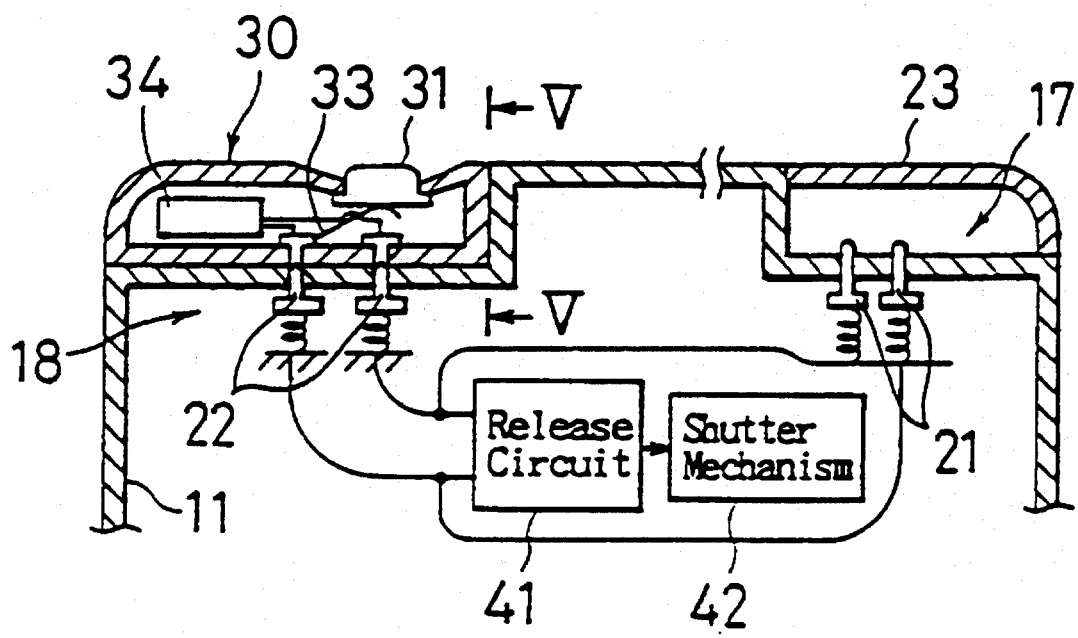
FIG. 4 is a sectional view showing a state in which a shutter release operating mechanism and a cap are attached to the camera body.
Figure 5:
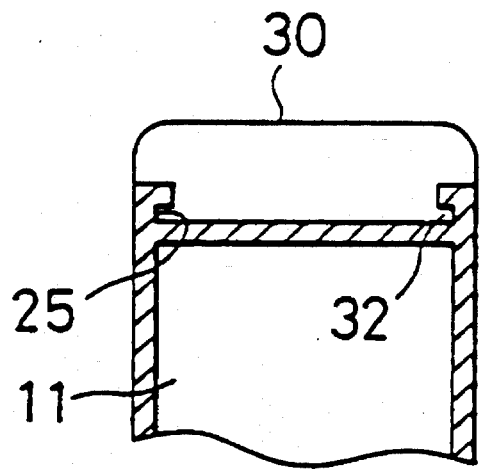
FIG. 5 is a sectional view taken along the line V—V of FIG. 4.

FIGS. 4 and 5 show a state in which the shutter release operating mechanism 30 and the cap 23 are attached to the camera body 11. FIG. 4 shows the camera when viewed from the front (the side at which the lens 12 is provided); in this drawing the camera is set so that it can be used by a right-handed person. Namely, the shutter release operating mechanism 30 is attached to the left shoulder 18 and the cap 23 is attached to the right shoulder 17, respectively.

A release circuit 41 and a shutter mechanism 42 are housed in the camera body 11, and contacts 21 and 22 are electrically connected to the release circuit 41, respectively. A switch 33 for opening and closing the contacts 21 and 22, and a transmitting circuit 34 for a remote control, are disposed in the shutter release operating mechanism 30. The switch 33 is controlled by the release button 31 to open and close the contacts 21 and 22. In a non-operative condition the contacts 21 and 22 are open. When the release button 31 is depressed, the switch 33 closes the contacts 21 and 22, and a signal is passed through the contacts 21 and 22 to actuate the release circuit 41 to thus control the shutter mechanism 41. Further, the transmitting circuit 34 is connected to the transmitting section 35 (FIG. 1). Therefore, in a remote control mode, when the release button 31 is depressed and the switch 33 closes the contacts 21 and 22, the transmitting circuit 34 causes the transmitting section 35 to radiate an infrared beam, whereby the release circuit 41 is actuated and the shutter mechanism 42 is thus released.

When a right-handed person uses the camera of this embodiment as described above, as shown in FIG. 2, the shutter release operating mechanism 30 is attached to the left shoulder 18, and the cap 23 is preferably attached to the right shoulder 17. When a remote control operation is carried out by this camera, as shown in FIG. 1, the shutter release operating mechanism 30 is detached from the camera body 11. When the release button 31 is depressed while pointing the transmitting section 35 at the receiving section 16, the shutter mechanism 42 is released.

Conversely, when a left-handed person uses the camera of this embodiment, the cap 23 is preferably attached to the left shoulder 18, and the shutter release operating mechanism 30 is attached to the right shoulder 18; this condition being opposite to that of FIG. 2. The detaching and attaching of the shutter release operating mechanism 30 and the cap 23 is carried out as follows. Namely, the shutter release operating mechanism 30 and the cap 23 are slidably moved along the guide grooves 24 and 25 and detached from the camera body 11. Thereafter, they are placed in reverse positions, and the guide projections 26 and 32 thereof are respectively inserted in the opposite grooves 24 and 25, to which the shutter release operating mechanism 30 and the cap 23 were previously attached. This operation is very simple.

The embodiment described above is constructed in such a manner that the shutter release operating mechanism 30 and the cap 23 can be freely attached to either the right shoulder 17 or the left shoulder 18. Therefore, according to this embodiment, a camera that can be used by both a right-handed person and a left-handed person is obtained without the need for making separate accessories for a right-handed person and a left-handed person.

Further, since in this embodiment the number of parts need not be increased when manufacturing a camera for use by both a right-handed person and a left-handed person, the cost of manufacturing the camera according to this embodiment can be lowered.

Figure 6:
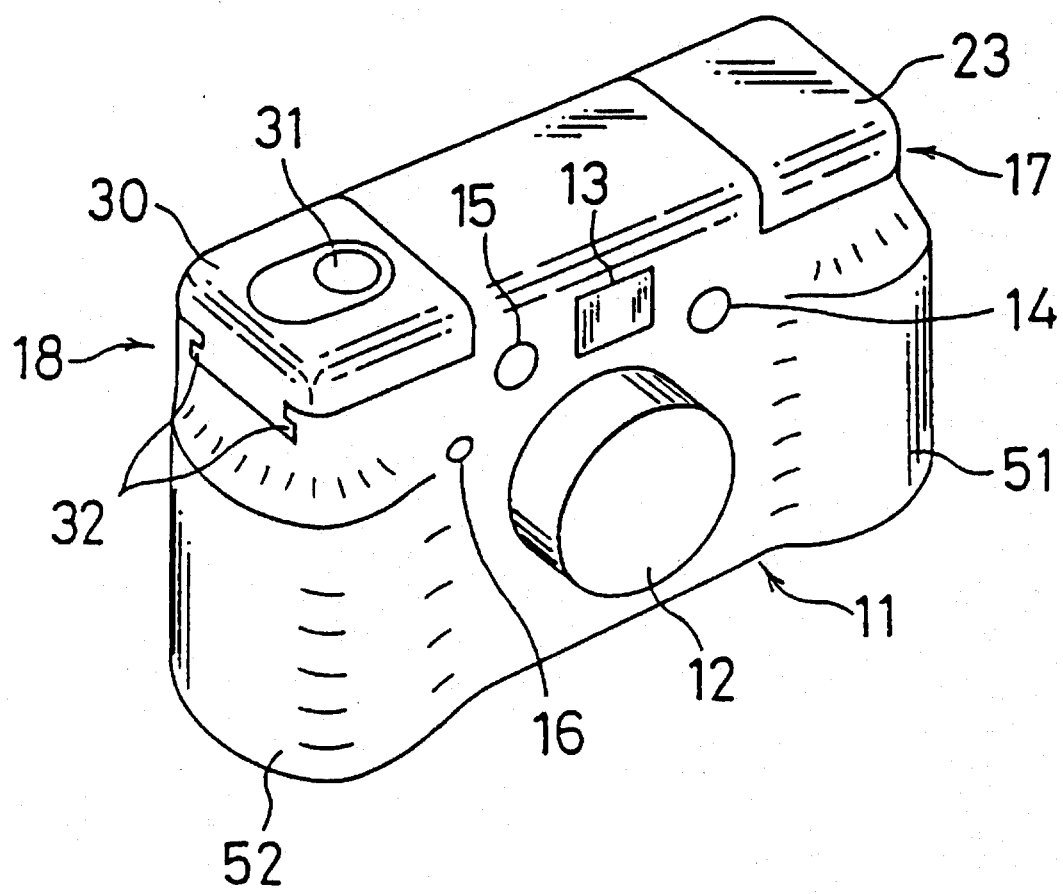
FIG. 6 is a perspective view showing a camera body having grip portions on a right side and a left side thereof.

Furthermore, in the above embodiment, the external shape of the camera body 11 is bisymmetric about the center line thereof, and therefore, grip portions 51 and 52 which are shaped to fit a hand of the operator, can be formed on both the right and the left sides of the camera body 11, as shown in FIG. 6. According to this construction, the camera body 11 can be easily held by either a right-handed person or a left-handed person.

It is noted that, although only the contacts 21 and 22 are provided for a shutter release operation on the right shoulder 17 and the left shoulder 18 in the above described embodiment, additional contacts such as for a self-timer, for a switch for preventing the use of an electronic flash, for a daylight synchronized mode, and for carrying out a backlight compensation may be provided, and switches corresponding to these contacts may be provided in the cap 23.

Although the embodiments of the present invention have been described herein with reference to the accompanying drawings, obviously many modifications and changes may be made by those skilled in the art without departing from the scope of the invention.

The present disclosure relates to subject matter contained in Japanese patent application No. 2-264731 (filed on Oct. 2, 1990) which is expressly incorporated herein by reference in its entirety.

I claim:

1. A camera and a shutter actuator for use with said camera, said shutter actuator comprising first means, located on said shutter actuator, for releasing a shutter of said camera when said shutter actuator is attached to said camera, second means, located on said shutter actuator, for releasing a shutter of said camera when said shutter actuator is detached from said camera, a shutter release operation member for actuating said first and said second shutter releasing means, and means for selectively detachably attaching said shutter actuator to two positions on said camera, said first shutter releasing means being actuatable by said shutter release operation member in each of said positions, said camera further comprising means for detachably connecting said shutter actuator to said camera at each of said positions, said connecting means cooperating with said attaching means of said shutter actuator to detachably connect said actuator to each of said positions on said camera.

2. The camera and shutter actuator according to claim 1, wherein said detachably connecting means are located on opposite sides of a plane in which a photographic optical axis of a lens of said camera is positioned.

3. The camera and shutter actuator according to claim 1, said first means comprising electrical contacts on a first surface of said actuator, said second means comprising a signal emitter on a second surface of said actuator.

4. The camera and shutter actuator according to claim 1, said detachably connecting means comprising two selectively usable connecting elements positioned on opposite side portions of said camera.

5. The camera and shutter actuator according to claim 4, further comprising a cap and means for selectively attaching said cap to one of said connecting elements.

6. The camera and shutter actuator according to claim 1, said first means comprising a set of electrical contacts on a first surface of said actuator, each of said detachably connecting means comprising a set of contacts positioned to engage said set of electrical contacts of said shutter actuator when said shutter actuator is attached to said camera.

7. The camera and shutter actuator according to claim 5, said camera further comprising a set of electrical contacts associated with each of said connecting elements, said cap comprising means for selectively covering one set of contacts provided on said camera.

8. The camera and shutter actuator according to claim 5, said cap comprising a surface flush with an exterior camera surface when attached to one of said connecting elements.

9. The camera and shutter actuator according to claim 1, further comprising an exterior surface flush with an exterior camera surface, when said shutter actuator is attached to said camera by said detachably connecting means.

10. The camera and shutter actuator according to claim 4, wherein said shutter actuator is selectively attachable to either of said connecting elements that are located at opposite sides of a lens of the camera.

11. The camera and shutter actuator according to claim 2, said detachably connecting means being symmetrically positioned about a center line of said camera, said center line of said camera lying in a plane which extends along said photographic optical axis.

12. The camera and shutter actuator of claim 2, wherein said camera has a front surface, and said plane is generally perpendicular to said front surface.

13. A shutter actuator in combination with a camera, said actuator comprising:

first means, positioned on a first surface of said shutter actuator, and including electrical contacts, for releasing a shutter of the camera when said electrical contacts are electrically connected to a shutter release circuit of said camera, said shutter actuator including means for selectively detachably attaching said shutter actuator to two shutter actuating positions on said camera;

second means, positioned on a second surface of said shutter actuator, for emitting a signal for releasing said shutter, when said shutter actuator electrical contacts are not electrically connected to a shutter release circuit of said camera and when the shutter actuator is detached from said camera and oriented so as to transmit the signal towards a signal receiving part of the camera; and a shutter release operation part for actuating said first and second shutter releasing means;

said camera comprising a plurality of detachable connecting means for selectively enabling detachable connection of said shutter actuator to each of said two shutter actuating positions on said camera, and for enabling selective detachment of said shutter actuator from the camera.

14. The shutter actuator and camera combination according to claim 13, further comprising a cap and means on said cap for selectively attaching said cap to any one of said plurality of detachable connecting means on said camera, said cap rendering one of said detachable connecting means incapable of being operably connected to said shutter actuator when said cap is attached to said camera.

15. The shutter actuator of claim 13 in combination with a camera, said camera including detachable connecting means, for selectively attaching said shutter actuator to said camera at two said shutter actuating positions on said camera, said positions being located on opposite sides of an optical axis of a camera lens.

16. A camera system having a shutter control device, said system comprising:

a camera body including a remote shutter release signal receiving mechanism and first and second selectively usable operation unit attaching/detaching means for selectively receiving an operation unit for releasing a shutter of said camera body;

an operation unit, said operation unit comprising means for releasing a shutter of said camera and means for enabling selective attachment and detachment of said operation unit to and from said first and second operation unit attaching/detaching means of said camera body; and a cap, said cap comprising means for selectively detaching and attaching said cap to and from said camera body, said cap further comprising means for selectively covering electrical contacts located adjacent said first and second operation unit attaching/detaching means of said camera body.

17. The camera system according to claim 16, said operation unit further comprising:

first means for releasing a shutter of said camera body, when said operation unit is attached to said camera body;

second means for generating a signal for cooperation with said remote shutter releasing signal receiving mechanism of said camera body, when said operation unit is detached from said camera body; and a shutter release operator for actuating said first and said second means.

18. A camera having a shutter and a shutter actuator for use with said camera, said shutter actuator comprising first means, positioned on a first surface of said shutter actuator, and including electrical contacts, for releasing a shutter of said camera when said electrical contacts are electrically connected to a shutter release circuit of said camera, second means, positioned on a second surface of said shutter actuator, for emitting a signal for releasing the shutter of said camera when said shutter actuator is oriented so as to transmit said signal towards a signal receiving part of said camera and when said shutter actuator is not attached to said camera, and a shutter release operation member for actuating said first and second shutter releasing means, said camera comprising means for selectively detachably connecting said shutter actuator to said camera at two separate shutter actuating positions on said camera, said positions comprising two positions which are positioned on opposite sides of a plane along which a photographic optical axis of said camera is located.

* * * * *